United States Patent Office 3,647,839
Patented Mar. 7, 1972

3,647,839
SYNTHESIS OF TETRAMETHYLLEAD
Ronald S. Bartlett, Corpus Christi, Tex., assignor to PPG
Industries, Inc., Pittsburgh, Pa.
No Drawing. Filed Nov. 20, 1969, Ser. No. 878,550
Int. Cl. C07f 7/241
U.S. Cl. 260—437 R                    12 Claims

ABSTRACT OF THE DISCLOSURE

A process is described for the preparation of tetramethyllead which involves reacting methyl chloride and sodium-lead alloy together in the presence of a catalyst involving a lithium-aluminum alloy. The alloy is described as containing at least 30 percent by weight lithium, preferably 50 percent by weight. The temperatures of operation described are typically from 90 to 150° C.

BACKGROUND OF THE INVENTION

The reaction involved in the conventional method of preparing tetramethyllead may be conveniently illustrated by the following equation:

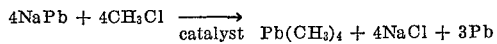

$$4NaPb + 4CH_3Cl \xrightarrow{catalyst} Pb(CH_3)_4 + 4NaCl + 3Pb$$

As will be appreciated the above reaction involves the conversion of one mole of lead to tetramethyllead. The 3 moles of elemental lead are typically recycled or reused to provide for further quantities of tetramethyllead when reacted with further quantities of mehyl chloride. The reaction is catalyzed as indicated. Typical of the catalysts used are various aluminum complex compounds, particularly alkyl aluminum halides such as diethyl aluminum chloride. While catalysts such as diethyl aluminum chloride are useful in making a tetramethyllead by the above reaction they do result in the production of other alkyl lead compound such as trimethylethyllead and dimethyldiethyllead. The quantity of tetramethyllead produced is therefore reduced. In addition these alkyl aluminum catalysts present a bothersome problem in the storage and handling of concentrated solutions thereof. Problems associated with alkyl aluminum derivatives in tetramethyllead reaction systems are discussed in U.S. Pat. 3,281,442.

THE PRESENT INVENTION

In accordance with the present invention tetramethyllead is produced in high purity and in good yields from a reaction system in which a methyl halide, preferably methyl chloride, is reacted with sodium-lead alloy in the presence of a catalyst comprising a lithium-aluminum alloy. Alloys of lithium-aluminum, when employed as catalysts in conventional tetramethyllead reactions such as described above, are found not only to be efficient as catalysts for producing tetramethyllead but are also found to be extremely effective in providing an essentially pure tetramethyllead product, that is, a product containing 99.5 percent tetramethyllead or more.

The reactions conducted in accordance with the instant invention are conducted at temperatures of at least 90° C., preferably at temperatures of 100° C. to 130° C. Broadly temperatures of 90° C. to 150° C. may be used in conducting the instant invention.

The lithium-aluminum alloys utilized in conjunction with the reaction systems of the instant invention to produce tetramethyllead typically contain at least 30 percent lithium by weight basis the weight of the lithium-aluminum alloy. The lithium content can be varied considerably and tetramethyllead is still produced. Typically the lithium content of the catalyst can be varied between 30 to 70 percent by weight lithium, preferably between 50 to 60 percent by weight.

In conducting the reactions of the instant invention recourse to the utilization of conventional sodium-lead alloys is had. These alloys may be freshly prepared sodium-lead alloys or they may be prepared from recycled active lead. There does not appear to be any criticality involved in the utilization of any particular sodium-lead alloy.

Reaction times while subject to wide variation are generally maintained in a range of between 1 and 4 hours.

In conducting the reactions in accordance with this invention, pressure equipment is normally used and reaction pressures encountered typically are between 200 to 600 p.s.i.g., preferably between 400 to 600 p.s.i.g.

Methyl halides employed may be the chloride, bromide or iodide. Preferably methyl chloride is used.

The methyl halide utilized should be as free as possible from contamination and essentially dry, that is, containing less than 250 parts per million water. It is important in the practice of this invention that the lithium-aluminum alloy catalyst, once prepared, be protected from the atmosphere and from moisture since these alloys are quite active. Any reaction of the alloy catalyst with moisture or air tends to deactivate the catalyst. Thus, the handling of the alloy after preparation should be such that contamination by air and/or moisture is avoided.

The lithium-aluminum alloy of the instant invention is prepared typically by melting metallic lithium and metallic aluminum in the desired quantities and mixing the two melted metals together. The molten metal mixture is then subjected to cooling to solidify it and crushed to any desired particle size for utilization in the methylation process. All grinding, melting and crushing operations are conducted substantially in the absence of any oxygen or moisture.

The catalyst concentration is based on the mole percent of aluminum utilized as the catalyst basis the amount of lead in the sodium-lead alloy charged to the reaction system. In general this concentration is 1 to 4 mole percent.

For a more complete understanding of the present invention, reference is made to the following examples which illustrate the practice of the invention in a suitable manner.

EXAMPLE I

A lithium-aluminum alloy was prepared as follows: 26.98 grams of aluminum wire were weighed out in a crucible and put in a dry box provided with an argon atmosphere. 7.50 grams of lithium were weighed out. The crucible was heated in the dry box by an electrical coil heated until the aluminum melted and then the lithium was added. The alloy or mixture was stirred for about 3½ minutes during which some bubbling and smoking of the mixture was observed. The mixture was then poured into a bronze pan. The alloy solidified in 10 seconds and was subsequently crushed with a mortar and pestle. The solidification and crushing steps were conducted in the dry box in the argon atmosphere.

The lithium-aluminum alloy so prepared was used in a stainless steel laboratory autoclave to produce tetramethyllead. The reactor was charged with 0.202 mole of sodium-lead alloy and 1.0 to 1.4 moles of methyl chloride. The catalyst concentration was varied between 2 and 1.5 mole percent aluminum basis the alloy charged. A reaction time of 3 hours was employed. The results of these runs under these conditions are shown in Table 1.

TABLE 1

| Run No. | Temp. (° C.) | Catalyst conc. (mole percent) | Na reacted (percent) | Yield, percent, TML Na charged by— | |
|---|---|---|---|---|---|
| | | | | GC [1] | EDTA [2] |
| 1 | 120 | 2 | 84.0 | 81 | 78.5 |
| 2 | 120 | 2 | 88.1 | 72.4 | 76.0 |
| 3 | 100 | 1.5 | 82.4 | 72.3 | 68.4 |

[1] Analysis by gas chromatograph.
[2] Analysis by ethylenediaminetetraacetic acid titration.

From the above it can be readily appreciated that lithium-aluminum alloy is an effective tetramethyllead catalyst.

I claim:

1. A method of producing tetramethyllead comprising reacting methyl halide and sodium-lead alloy in the presence of a catalytic amount of lithium-aluminum alloy containing between 30 to 70 percent by weight lithium therein to thereby produce tetramethyllead.

2. A method of producing tetramethyllead comprising reacting methyl halide and sodium-lead alloy in the presence of a catalytic amount of lithium-aluminum alloy containing at least 30 percent by weight lithium.

3. A method of producing tetramethyllead comprising reacting methyl halide and sodium-lead alloy in the presence of a lithium-aluminum alloy containing at least 30 percent by weight lithium said reaction being conducted at temperatures of from 90° C. to 150° C.

4. The method of claim 3 wherein the temperature is between 100° C. and 130° C.

5. The method of claim 1 wherein the reaction temperature is between 90° C. and 150° C.

6. The method of claim 2 wherein sufficient lithium-aluminum alloy is utilized to provide between 1 to 4 mole percent of aluminum basis the amount of lead in the sodium-lead alloy.

7. A method of producing tetramethyllead comprising reacting methyl halide and sodium-lead alloy in the presence of a lithium-aluminum catalyst containing at least 50 percent by weight lithium at temperatures of 100 to 120° C.

8. The method of claim 7 wherein the catalyst concentration is between 1 and 4 mole percent aluminum based on the alloy used.

9. The method of claim 1 wherein the methyl halide is methyl chloride.

10. The method of claim 2 wherein the methyl halide is methyl chloride.

11. The method of claim 3 wherein the methyl halide is methyl chloride.

12. The method of claim 7 wherein the methyl halide is methyl chloride.

References Cited
UNITED STATES PATENTS

| | | | |
|---|---|---|---|
| 3,048,610 | 8/1962 | Jarvie et al. | 260—437 R |
| 3,113,955 | 12/1963 | Sandy | 260—437 R |
| 3,072,695 | 1/1963 | Tullio | 260—437 R |
| 2,848,471 | 8/1958 | Pagliarini | 260—437 R |

TOBIAS E. LEVOW, Primary Examiner

H. M. S. SNEED, Assistant Examiner